Nov. 1, 1927.

W. M. BRADSHAW

THERMOSTATIC REGULATOR

Filed Nov. 5, 1923

WITNESSES:

INVENTOR
William M. Bradshaw
BY
ATTORNEY

Nov. 1, 1927.
W. M. BRADSHAW
1,647,336
THERMOSTATIC REGULATOR
Filed Nov. 5, 1923    2 Sheets-Sheet 2
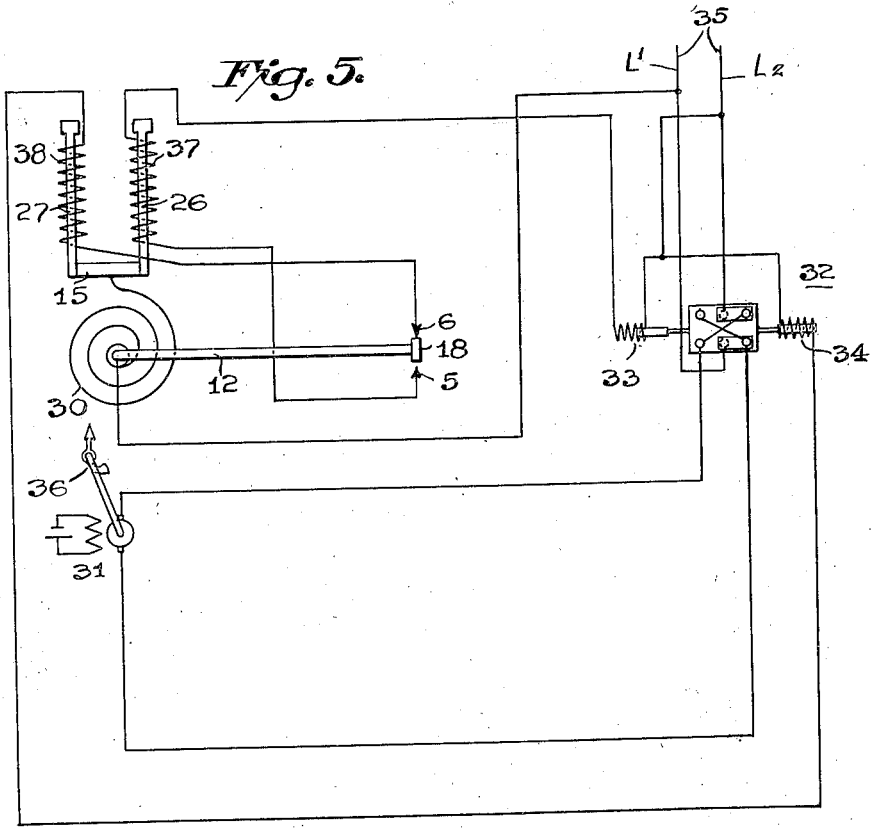
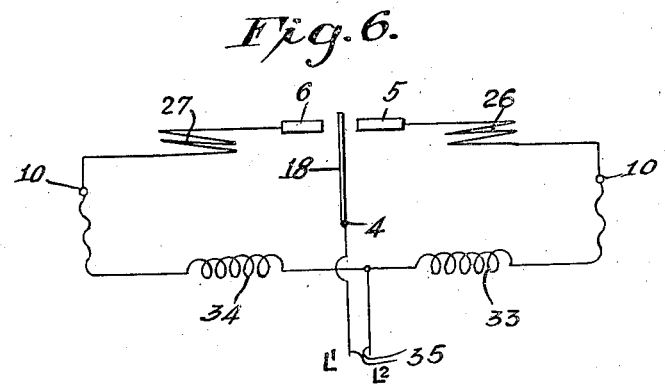
WITNESSES:
R. S. Harrison
Lester L. Budlong
INVENTOR
William M. Bradshaw
BY
Wesley G. Carr
ATTORNEY Patented Nov. 1, 1927.

1,647,336

UNITED STATES PATENT OFFICE.

WILLIAM M. BRADSHAW, OF WILKINSBURG, PENNSYLVANIA, ASSIGNOR TO WESTINGHOUSE ELECTRIC & MANUFACTURING COMPANY, A CORPORATION OF PENNSYLVANIA.

THERMOSTATIC REGULATOR.

Application filed November 5, 1923. Serial No. 672,830.

My invention relates to systems of thermal control and particularly to thermostatic regulators therefor.

One object of my invention is to provide a thermal control or regulating device that shall have means for controlling the supply of current to an electrical translating device in a series of increments, each of which is of decreasing duration as the thermal control device approaches a predetermined temperature.

Another object of my invention is to provide a thermal control device, of the above-indicated character, that shall be adapted to interrupt a heating current slightly in advance of the generation of a predetermined temperature in the thermostat.

Another object of my invention is to provide a thermostat, of the above-indicated character, having a thermo-responsive element that is exposed to an external source of thermal energy and having auxiliary means for compensating for the thermal gradient between the source of thermal energy and the thermo-responsive element.

A further object of my invention is to provide a thermostat, of the above-indicated character, that shall be effective in its operation and economical in construction.

In controlling a thermal translating device by means of a thermostat there is always a thermal gradient between the translating device and the regulating thermostat caused by the time consumed in the transmission of thermal energy from one to the other by convection, radiation or conduction. By reason of this thermal gradient, there is always a time lag between the operation of the thermostat and the obtaining of the desired temperature in the thermal translating device. In the event that the thermostat is calibrated to operate when the temperature of the thermal translating device reaches a predetermined value, it is necessary that this temperature in the translating device be reached and continued for a time interval or exceeded until the thermal energy translated to the thermostat reaches the desired value.

The reverse is true when it is desired to have the thermostat follow a decreasing thermal value in the translating device. The effect of this thermal gradient between the thermostat and the thermal device is usually referred to as "hunting".

In accordance with my invention, I provide a motor for actuating a gas valve for a gas heater or other thermal translating or heating means. I further provide a reversing switch for the motor and a main thermal-responsive device subjected to the heating means that is controlled by the motor. The main thermal-responsive device controls the reversing switch and auxiliary thermal devices are disposed with respect to the main thermal-responsive device that the operation of the main thermal-responsive device is adapted to so control the reversing switch and the motor that the change in temperature is achieved by a series of increments, each of which is of decreasing duration as the main thermal-responsive device and the heating means approach a predetermined temperature.

In the accompanying drawings,

Fig. 5 is a diagrammatic view of apparatus and circuits embodying my invention, and Fig. 6 is a simplified view of circuits and apparatus illustrated in Fig. 5.

In the several figures of the drawing, similar reference numerals indicate like parts.

Figure 1:
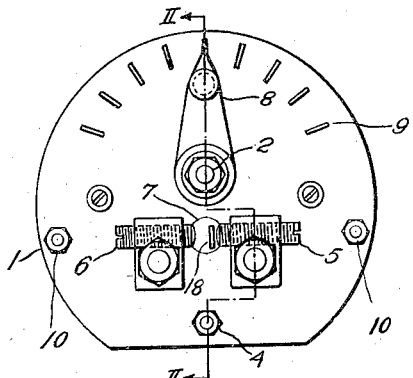
Figure 1 is a front elevational view of a thermostat embodying my invention.

My invention comprises, in general, a thermostatic regulator having a main thermal element 30, contact members 5, 6 and 18 therefor, and thermal means 26 and 27 for so controlling the thermal element 30 as to disengage the contact members in advance of the generation of a predetermined temperature in the main thermal element 30. The contact members 5, 6 and 18 are adapted to control a reversing switch 32 which, through a member 31, controls a gas valve 36 or other thermal translating device, as shown in Fig. 5 of the drawings.

Referring to Figs. 1 to 4, inclusive, the thermostatic regulator embodying my invention comprises a base member 1 of suitable insulating material, such as porcelain, that is provided with an opening for the reception of a shaft 2 and a bushing 2ª therefor. A terminal member 4 extends through the base 1 and a pair of similar adjustable stationary contact members 5 and 6 are suitably secured thereto. An opening 7 is disposed between the contact members 5 and 6 for a purpose to be hereinafter described. A handled pointer 8 is secured to the shaft 2 and is adapted to co-operate with a scale 9 described on the base member 1. An auxiliary terminal member 10 is mounted adjacent to each of the contact members 5 and 6.

Figure 2:
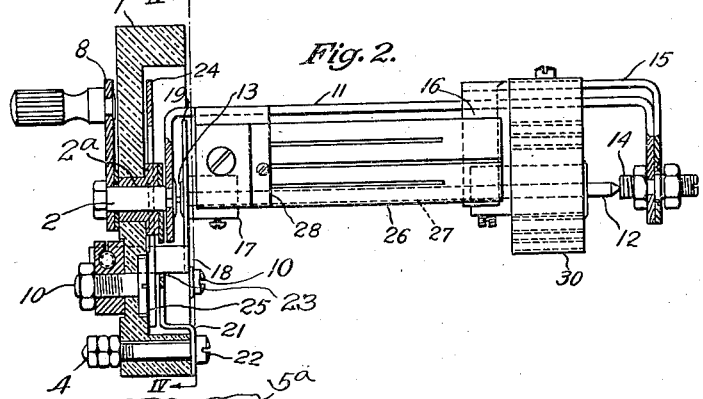
Fig. 2 is a side elevational view of the thermostat shown in Fig. 1, a part thereof being shown in section taken on the line II—II of Fig. 1.
Figure 4:
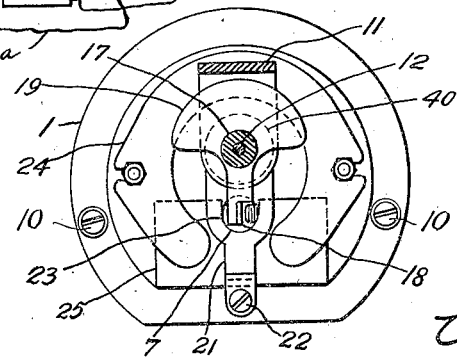
Fig. 4 is a sectional view of my improved thermostat taken along the section line IV—IV of Fig. 2.

As shown in Figs. 2 and 4, the shaft 2 extends through the base member 1 and is rigidly attached to a movable supporting member 11. A second shaft 12 is journalled, as at 13, at one end in the shaft 2 and at its other end, is supported by an adjustable bearing 14, which is carried by the supporting member 11.

A yoke member 15 is pivotally mounted on the bearing 14 and comprises a pair of projections 16 adapted to straddle the supporting member 11. The yoke member 15 and the supporting member 11 have a limited amount of independent relative movement.

As best shown in Fig. 4, the shaft 12 has rigidly secured thereto a collar 17 which, in turn, supports a movable contact member 18 and a counterweight 19. The contact member 18 is of L-shape and projects through the opening 7 in the base member 1 between the contact members 5 and 6. A strap 21 is secured to the base member 1, as at 22, and surrounds the shaft 2 adjacent the base portion 1, thereby bracing the structure. The strap member 21 is electrically connected to the terminal 4 and serves as a conductor from the terminal 4 to the shaft 2 and the movable contact member 18. The contact member 18 extends through a perforation 23 in the strap member 21.

A permanent magnet 24 is mounted on the inner face of the base member 1 in such position that its poles terminate on opposite sides of the contact member 18. A sheet of insulating material 25 is disposed between the poles of the magnet 24 and the supporting screws for the contact members 5 and 6.

Figure 3:
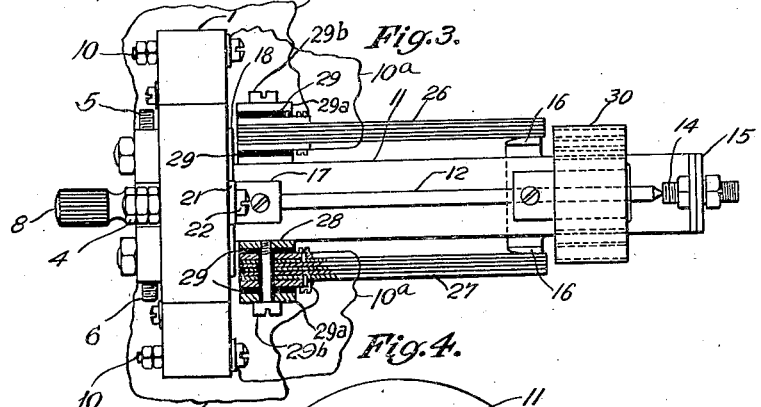
Fig. 3 is a side elevational view of a thermostat embodying my invention, showing the details thereof rotated through an angle of 90° from their position shown in Fig. 2.

Auxiliary bimetallic members 26 and 27 are rigidly secured at one end to extensions 28 of the supporting member 11. These auxiliary members may be heated by windings 37 and 38, as shown in Fig. 5, or the heating current may traverse the members directly, as shown in Figs. 2 and 3.

The individual bimetallic strips are longitudinally slotted from alternate ends thereof to provide a relatively long current path of relatively small area of lateral section. The individual strips of the members 26 and 27 may be so connected that all of them are in series-circuit relation to each other, or they may be so connected that they are in parallel-circuit relation relatively to each other, in accordance with the normal value of the current traversing a circuit with which the device is to be operatively associated. Such connection is effected by suitably located electric-insulating and electric-conducting members in a manner well known in the art.

Insulating washers 29 are placed between the members 26 and 27 and the extensions 28 and between the members 26 and 27 and outer plates 29ª. Screws 29ᵇ are employed to secure the members 26 and 27 against the extensions 28.

The free end of the members 26 and 27 are so disposed as to bear upon the outer faces of the projections 16 of the yoke member 15.

The auxiliary and bimetallic member 26 is connected between the stationary contact member 5 and one of the terminal members 10 by means of conductors 5ª and 10ª, respectively, and the auxiliary bimetallic member 27 is connected between the stationary contact member 6 and the other terminal 10 by means of conductors 10ª and 6ª (see Fig. 3). A coil spring 30, of suitable bimetallic material, is secured at one end to the shaft 12 and at its other end to the yoke 15.

As is shown in Fig. 5, the motor 31 or other electrical translating device, is provided for controlling the valve 36 of a gas burner or other heat translating device. A reversing switch 32 having operating coils 33 and 34 is placed in circuit with the armature of the motor 31 for controlling the direction of current supplied thereto from a source of current 35. The operating coils 33 and 34 are in series relation with the windings 37 and 38 of the members 26 and 27, respectively.

In Fig. 6 of the drawings, a modification of Fig. 5 is illustrated, and, as there shown, the bimetallic member 27 is electrically connected between the contact member 6 and one of the terminals 10. The terminal 10 is connected to one end of the coil 34, the other end of which is connected to line L² of the source of supply 35. The bimetallic member 26 is electrically connected between contact member 5 and the other terminal 10, which is connected to one end of the coil 33, the other end of which is connected to line L². The contact member 18 is electrically connected to line L¹ by means of the terminal 4.

In the operation of a thermal control system embodying my invention, the operator moves the handle 8 until it registers with the proper mark on the scale 9 on the base member 1. During this operation, movement of the shaft 12 is confined to a limited number of degrees by reason of the engagement between the movable contact member 18 and one of the stationary contact members 5 or 6. However, the other end of the thermal-responsive spring moves through substantially the same number of degrees as the handle 8. The result of this relative movement between the two ends of the spring 30 is to vary the torsion therein, and, accordingly, to vary the temperature at which the spring 30 causes movement of the shaft 12. The completion of the circuit between the movable contact member 18 and either of the stationary contact members 5 or 6 energizes the corresponding operating coil 33 or 34 of the reversing switch 32 and the translating device or motor 31 is caused to turn the valve 36 in the one direction or the other to control the heating of the device, the temperature of which is to be regulated.

The bimetallic spring 30 is so disposed adjacent to the gas or other heating means that its thermal condition corresponds closely thereto. The transfer of thermal energy may take place by radiation, convection or conduction, as desired. However, the thermal condition of the heating device will always be slightly in advance of the thermal condition of the spring 30.

The heat sensitive bimetallic elements 26, 27 and 30 being placed in the space whose temperature is to be regulated will have, at all times, a temperature approximately that of the chamber. In the event that the temperature of the regulated space is below the regulative temperature, the tension of spring 30, applied through shaft 12, will carry contact member 18 against one of the contact members 5 or 6, thereby actuating the proper magnet 33 or 34 to energize the translating device 31 in the proper direction to turn the valve 36 to the position for increasing the temperature of the heated space.

As the temperature of this space approaches that for which the regulator is adjusted, the torque developed by spring 30 becomes progressively less and reverses in direction as the regulative temperature is passed. Upon the development of a sufficient torque in reverse direction, contact member 18 will be thrown from the first contact to the other contact, thereby energizing the other circuit in the switch 32 to actuate the device 31 to reduce the intensity of heat applied to the regulated chamber.

During the time that the temperature is below the regulative point, and contact made by contact element 18 with the stationary contact members 5 or 6, a current is carried by the windings of the corresponding bimetal spring 26 or 27. In consequence of this thermal sensitivity, the spring 26 or 27 exerts a biasing torque upon the outer end of the spring 30. This torque is in such direction as to enable the movable contact member 18 to disengage its co-operating stationary contact slightly before the regulative temperature is reached.

Upon the contact member 18 engaging the other stationary contact member, a current flows through the other of the bimetallic elements 26 and 27, causing it, in turn, to heat and develop a torque. This torque biases the spring 30 in the reverse direction and enables the spring 30 to pull contact member 18 away from the last engaged stationary contact member 5 or 6 before a large temperature change has occurred in the translating device. The bimetallic springs 26 and 27 cool after each operation to remove the biasing torque from spring 30, whereupon the spring 30 is enabled to shift the movable contact member 18 against the one or the other of the stationary contact members 5 or 6, according as the temperature is above or below the regulating point.

The thermal energy generated in the winding of the connected auxiliary bimetallic member 26 or 27 is such as to cause it to warp in a characteristic manner away from its associated projection 16. The movement of the auxiliary heating unit permits a slight turning movement of the yoke member 15 which in turn varies the tension of the spring 30 and, accordingly, permits the spring 30 to move the shaft 12 and the movable contact member 18 slightly in advance of the thermal condition which it would naturally exert before the movement of the contact member 18.

By reason of the magnetic condition of the stationary contact members 5 and 6, a definite amount of torsion must be applied to the shaft 12 before the contact member 18 is caused to move. However, upon the interruption of the circuit between one of the stationary contact members 5 and 6 and the movable contact member 18 and the completion of the circuit between the other stationary contact member and the movable contact member 18, the translating device 31 is caused to reverse its action in such manner that different thermal energy is supplied, and, accordingly, the shaft 12 tends to turn back to its original position and reestablish the original heating circuit. It is obvious that as the thermal condition of the spring 30 approaches that of the translating device 31, that the number of thermal impulses will be increased while the duration of each impulse is correspondingly decreased. This action permits the development of a predetermined thermal condition in the transmitting device 31 by a series of increments of increasing duration, whereby the phenomena known as "hunting" is eliminated and a definite temperature may be obtained without overheating.

While I have shown and described a specific embodiment of my invention, it is to be understood that such changes and arrangements may be made in the apparatus as here shown as follows in the scope of the appended claims.

I claim as my invention:

1. In a thermostat, the combination with a rotatable shaft, a pair of relatively movable contact members controlled thereby, and a thermo-responsive actuating device therefor, of a plurality of oppositely-acting auxiliary thermally-actuated members for controlling said thermal actuating device.

2. In a thermostat, the combination with a rotatable shaft, a pair of relatively movable contact members controlled thereby, and a thermo-responsive actuating device therefor, of an auxiliary current-traversed thermally-actuated member for accelerating the operation of said actuating device.

3. In a thermostat, the combination with a rotatable shaft, a pair of relatively movable contact members controlled thereby, and a thermo-responsive actuating device therefor, of auxiliary thermally-actuated members for selectively accelerating the operation of said actuating device in accordance with the direction of movement of one of said contact members.

4. The method of controlling the temperature of an electrical translating device which consists in supplying electrical energy to said translating device in increments of decreasing duration as the desired temperature of the translating device is approached.

5. In a thermostat, the combination with a rotatable shaft, relatively movable contact members controlled thereby, and a thermo-responsive actuating spring therefor for effecting disengagement or engagement of said contact members at a predetermined temperature, of means comprising a supporting member, and a yoke member attached at one end of said spring for varying the effective relative positions of said actuating spring and shaft, and a pair of auxiliary heating elements mounted on said supporting member at diametrically opposite points relative to said shaft for effecting operation of said actuating spring in advance of said predetermined temperature in said actuating spring.

6. In a thermostat, the combination with a rotatable shaft, relatively movable contact members controlled thereby, and a thermo-responsive actuating spring therefor for effecting engagement and disengagement of said contact members at a predetermined temperautre, of means comprising a supporting member, a yoke member attached at one end of said spring for varying the effective relative positions of said actuating spring and shaft, and a pair of bimetallic thermostats mounted on said supporting member at diametrically opposite points relative to said shaft for effecting operation of said actuating spring in advance of said predetermined temperature in said actuating spring.

7. In a thermostat, the combination with a rotatable shaft, relatively movable contact members controlled thereby, and a thermo-responsive actuating spring therefor, of means comprising a supporting member, and a yoke member attached at one end of said spring for varying the effective relative positions of said actuating spring and shaft, and a pair of bimetallic thermostats mounted on said supporting member and in stressed engagement with said yoke member.

8. In a thermostat, the combination with a rotatable shaft, relatively movable contact members controlled thereby, and a thermo-responsive actuating spring therefor, of means comprising a supporting member, and a yoke member attached at one end of said spring for varying the effective relative positions of said actuating spring and shaft, and a pair of bimetallic thermostats mounted on said supporting member and in stressed engagement with said yoke member, said yoke member and the attached spring being shifted relatively to said supporting member under predetermined thermal conditions in said thermostats.

9. In combination, a rotatable shaft, a pair of relatively movable circuit members controlled thereby, a thermo-responsive spring for actuating said shaft in response to the thermal influence of an external electrical translating device, and a heating element disposed adjacent to said spring and energized in accordance with the position of said spring, whereby said shaft is actuated in accordance with the thermal energy generated by said translating device and by the thermal energy generated by said heating element.

10. In a thermostatic regulator, the combination with co-operating contact members, and a thermally-responsive means for effecting engagement therebetween, of current traversed thermal means, actuable in accordance with the relative positions of the contact members, for modifying the effectiveness of the thermally-responsive means.

11. In a thermostatic regulator, the combination with co-operating contact members, and a thermally-responsive means for effecting engagement therebetween, of a plurality of auxiliary thermal means, selectively actuable in accordance with the relative positions of the contact members, for modifying the effectiveness of the thermally-responsive means.

12. In a thermostatic regulator, the combination with co-operating contact members, and a main thermally-responsive means for effecting engagement and disengagement between said co-operating contact members in response to the thermal influence of an energy-translating device, of auxiliary thermally-influenced means, selectively energized in accordance with the relative positions of the co-operating contact members, for effecting operation of the main thermally-responsive means in accordance with the thermal energy of said energy-translating device and with the thermal energy of an auxiliary thermally-influenced means.

13. In a thermostatic regulator, the combination with co-operating contact members, and a main thermally-responsive means for effecting engagement therebetween, of a plurality of auxiliary thermo-responsive members, means for causing an electric current to selectively traverse said auxiliary members in accordance with the engagement of said contact members, and means whereby the auxiliary thermo-responsive members modify the operation of said main thermally-responsive means.

In testimony whereof, I have hereunto subscribed my name this 29th day of October, 1923.

WILLIAM M. BRADSHAW.